UNITED STATES PATENT OFFICE.

WILLIAM J. REAGAN, OF NEW BRIGHTON, NEW YORK, AND REGINALD R. LONGLEY, OF BAYONNE, NEW JERSEY.

COMPOSITION OF MATTER FOR PLASTERING WALLS, &c.

SPECIFICATION forming part of Letters Patent No. 451,519, dated May 5, 1891.

Application filed January 20, 1891. Serial No. 378,402. (No specimens.)

*To all whom it may concern:*

Be it known that we, WILLIAM J. REAGAN, a citizen of the United States, residing at New Brighton, Richmond county, and State of New York, and REGINALD R. LONGLEY, residing at Bayonne, county of Hudson, and State of New Jersey, a subject of the Queen of Great Britain, have invented a certain new and useful Composition of Matter for Plastering Walls and the Like, of which the following is a specification.

Our invention has for its object the manufacture of a plaster composition which shall be cheap, strong, light, and durable.

It is our intention to prepare our material either in slabs for the purpose of nailing them direct to the studding or into blocks for the construction of walls and for deadening purposes, although our invention may be used as ordinary plaster for plastering a wall upon the lathing.

Our composition consists of the following ingredients, combined, preferably, in the proportions stated, namely: seventy-five per cent. of soapstone of commerce, twenty-five per cent. of plaster-of-paris, and a vegetable or animal fiber thoroughly interspersed in the mass. We do not limit ourselves to these proportions, as they may be varied at will without departing from the spirit of our invention.

We proceed for the production of our composition of matter as follows: We take ordinary soapstone of commerce and grind or comminute it, preferably reducing it to a fine powder. The soapstone before it is ground may be either naturally or artificially dried for the purpose of expelling its contained moisture; but this step we do not consider essential. We next take plaster-of-paris, grinding or comminuting it, preferably reducing it also to a fine powder. We then intimately mix or commingle the ground soapstone and plaster-of-paris together, and placing this in a proper receptacle pour therein sufficient water, either hot or cold, as may be desired, to reduce the mass to a free-flowing fluid, preferably about the consistency of cream. This forms, when set, the basis of our composition of matter.

At any time, either prior to or after the making of the mixture of soapstone and plaster-of-paris, as before stated, we place within a mold, which is suitably shaped to turn out a particularly-shaped slab or block, a mass of fibrous material, preferably Manila fiber. This fiber we lay at the bottom of the mold, and when suitably arranged we pour the fluid mixture of plaster-of-paris and soap-stone upon it, mixing the mass together, so that the fiber will become thoroughly interspersed in it, such fiber acting to hold or bind the mass together. This is permitted to remain in the mold from ten to fifteen minutes, or until such time as it has become thoroughly set, and after that it is taken and placed in a shed or other convenient place for about ten days or two weeks to become thoroughly dry. The slab or block may be dried either artificially or naturally in a much shorter space of time, if desired. While being dried it is preferably placed on end to secure an even setting.

By the admixture of soapstone to the other ingredients we obtain an element in the composition which we consider just as efficient for the purposes of a wall-covering as the other ground calcareous material usually used, while at the same time it is much cheaper, thus making the material much more economical.

We do not limit ourselves to the exact proportions named, nor do we limit ourselves to the method of preparing the same, nor the order of the steps thereof.

What we claim, and desire to secure by Letters Patent, is—

The herein-described composition of matter, comprising soapstone, plaster-of-paris, and a fibrous material, substantially as described.

WILLIAM J. REAGAN.
REGINALD R. LONGLEY.

Witnesses:
R. G. McDONALD,
CHAS. J. DEYOUNG.